US012076649B2

(12) United States Patent
Gillis et al.

(10) Patent No.: US 12,076,649 B2
(45) Date of Patent: Sep. 3, 2024

(54) APPARATUS AND METHODS FOR SIMULATING AUTHENTICATION WITHIN THE METAVERSE

(71) Applicant: Bank of America Corporation, Charlotte, NC (US)

(72) Inventors: Trish Gillis, Chicago, IL (US); Jennifer Sanctis, Charlotte, NC (US); Taylor Farris, Hoboken, NJ (US)

(73) Assignee: Bank of America Corporation, Charlotte, NC (US)

( * ) Notice: Subject to any disclaimer, the term of this patent is extended or adjusted under 35 U.S.C. 154(b) by 233 days.

(21) Appl. No.: 17/750,582

(22) Filed: May 23, 2022

(65) Prior Publication Data
US 2023/0372830 A1    Nov. 23, 2023

(51) Int. Cl.
*A63F 13/825*  (2014.01)
*A63F 13/5258* (2014.01)
*A63F 13/79*   (2014.01)

(52) U.S. Cl.
CPC ........ *A63F 13/825* (2014.09); *A63F 13/5258* (2014.09); *A63F 13/79* (2014.09)

(58) Field of Classification Search
CPC .... A63F 13/825; A63F 13/5258; A63F 13/79; A63F 13/71
See application file for complete search history.

(56) References Cited

U.S. PATENT DOCUMENTS

| | | | | |
|---|---|---|---|---|
| 2010/0064359 | A1* | 3/2010 | Boss | H04L 63/08 726/7 |
| 2023/0139813 | A1* | 5/2023 | Thiel | G06F 21/31 726/7 |
| 2023/0237722 | A1* | 7/2023 | Stewart | G06V 10/764 345/473 |
| 2023/0316263 | A1* | 10/2023 | Eby | H04L 9/0825 |
| 2023/0419353 | A1* | 12/2023 | Jang | G06F 21/32 |

\* cited by examiner

*Primary Examiner* — James S. McClellan
(74) *Attorney, Agent, or Firm* — Weiss & Arons LLP

(57) ABSTRACT

Apparatus and methods are provided for providing and simulating authentication within a metaverse. A user may request to be authenticated by a computer program. The program may authenticate the user. The program may create a time-limited avatar overlay for the user to utilize within the metaverse. The time-limited avatar overlay may be transmitted to the user. The user may use the avatar overlay within the metaverse to authenticate the user. The user may authenticate through any appropriate method, including by providing a copy of a real identification card to the program. In an embodiment, the avatar overlay may be a digital representation of the identification card or a digital token.

18 Claims, 6 Drawing Sheets

APPARATUS AND METHODS FOR SIMULATING AUTHENTICATION WITHIN THE METAVERSE

FIELD OF TECHNOLOGY

This application includes apparatus and methods for simulating and providing authentication services within the metaverse.

BACKGROUND

A (or 'the') metaverse may refer to a shared virtual environment or world, accessed by users through virtual reality or augmented reality devices. Users may be able to interact with the virtual environment as well as with other users within the metaverse. The virtual environment may include simulated environments, simulated stores, simulated/actual applications, as well as other locations.

Users may be represented within the metaverse (to other users or to computers) by avatars. Avatars may appear as facsimiles of the user or as creative representations of the user. Avatars may be assigned to a user by a central authority. Avatars may be designed by a user. Users may also have usernames within the metaverse. Usernames may be the user's actual name or a unique identifier chosen by (or assigned to) the user.

Transactions and other financial activities may occur within the metaverse. Financial institutions may create a virtual location/storefront within the metaverse. Retail or other stores may sell real or virtual items within the metaverse. In addition, real currency as well as cryptocurrencies (distributed ledger tokens) and non-fungible tokens ("NFTs") may be bought, sold, and traded within the metaverse.

Currently, there is no apparatus or method available to provide authentication an avatar (or user) within the metaverse.

Therefore, it would be desirable to provide apparatus and methods for simulating and providing authentication services within the metaverse.

SUMMARY OF THE DISCLOSURE

It is an object of this disclosure to provide apparatus and methods for providing authentication to users within the metaverse, allowing for securely expanded services within the metaverse.

An authentication computer program product for authenticating a user within a metaverse is provided. The computer program product may include executable instructions. The executable instructions may be executed by a processor on a computer system. The authentication computer program product may receive a request to authenticate the user from the user. The program may determine the request is a legitimate request by authenticating the user. The program may then create a time-limited avatar overlay that may authenticate the user within the metaverse. The program may transmit the time-limited avatar overlay to the user. The program may display the time-limited avatar overlay within the metaverse when prompted by the user.

In an embodiment, the transmission of the avatar overlay may be encrypted.

In an embodiment, the authentication request may be determined to be legitimate by the program when the user provides a government-issued identification card to a camera in communication with the computer program product.

In an embodiment, the computer program product may be configured to use one or more artificial intelligence/machine learning ("AI/ML") algorithms to perform one or more of its functions.

In an embodiment, the authentication request may be determined to be legitimate when the user provides one or more passwords to the computer program product.

In an embodiment, the request may be determined to be legitimate when the user provides a government-issued identification card to a camera in communication with the computer program product and provides one or more real-time biometric attributes to one or more biometric sensors in communication with the computer program product.

In an embodiment, the request may be determined to be legitimate when the user provides a government-issued identification card to a camera in communication with the computer program product and provides a real-time image of the user to the camera.

In an embodiment, the time-limited avatar overlay may be limited to one session within the metaverse.

In an embodiment, the time-limited avatar overlay may be a digital representation of a government-issued identification card belonging to the user.

In an embodiment, the time-limited avatar overlay may be a digital representation of an image of the user.

In an embodiment, the time-limited avatar overlay may be a digital representation visible to a computer and invisible to the user.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
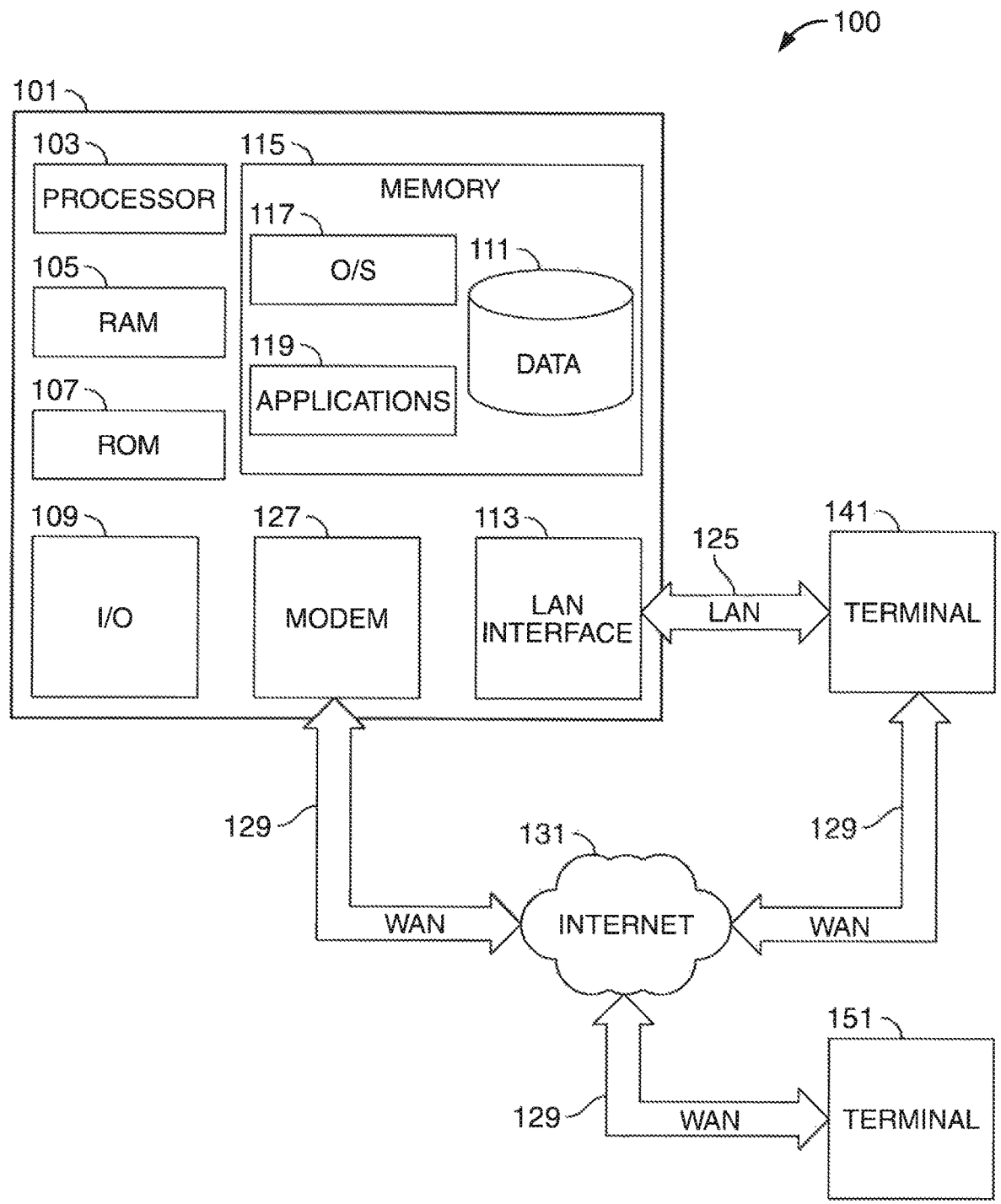
FIG. 1 shows illustrative apparatus in accordance with principles of the disclosure.

An authentication computer program product for authenticating a user within a metaverse is provided.

The computer program product may include executable instructions. The executable instructions may be executed by a processor on a computer system. The computer system may be any suitable computer system, such as a server, a mobile device, a smartphone, etc. The server may be centralized or distributed. The computer system may include various components, such as one or more processors, non-transitory memory, communication links, input/output modules, display screens, peripherals, an operating system, various applications, as well as other components.

The authentication computer program product may receive a request to authenticate the user from the user. The user may transmit the request from any suitable computer, such as a smartphone, a mobile device, a virtual reality/ augmented reality headset, a desktop computer, a laptop computer, or other computer system. The user may transmit the request when the user desires to be authenticated within the metaverse, e.g., when the user plans on performing a financial transaction within the metaverse. In an embodiment, the user may transmit the request as a pre-requisite to joining a session within the metaverse (i.e., as part of a login procedure).

The program may determine the request is a legitimate request by authenticating the user. If the program cannot authenticate the user, the request will be treated as illegitimate, and the user may not be authenticated. The program may authenticate the user through one or more methods, discussed infra. Other suitable authentication methods may be used, such as one-time passwords, passwords, multi-facto authentication, PINs, biometric attributes, and any other suitable authentication method.

The program may then create a time-limited avatar overlay that may authenticate the user within the metaverse. Due to its time-limited nature, the avatar overlay may function similarly to a one-time password. The avatar overlay may appear within the metaverse. The avatar overlay may appear within the metaverse when activated by the user. The avatar overlay may be superimposed upon the user's existing avatar. The avatar overlay may replace the user's existing avatar. The avatar overlay may appear proximate to the user's avatar. The avatar overlay may automatically expire after a pre-determined length of time. The avatar overlay may automatically expire at a pre-determined time. The avatar overlay may automatically expire when an expiration condition is met. For example, an expiration condition may be the user exiting the metaverse, or the user completing a single (or other finite number) transaction within the metaverse.

The program may transmit the time-limited avatar overlay to the user/the user's computer system. The avatar overlay may be transmitted to the same or a different channel than the channel used to request authentication. For example, the user may request authentication from a mobile phone, but access the metaverse through a desktop computer. The avatar overlay may be transmitted to the desktop computer instead of the mobile phone. The addresses and identities of computing devices associated with the user may be stored in a database.

In an embodiment, the program may display the time-limited avatar overlay within the metaverse when prompted by the user. In this embodiment, transmission of the avatar overlay may not be necessary.

In an embodiment, the transmission of the avatar overlay may be encrypted. Any suitable encryption method may be used. Other aspects of the invention may be encrypted as well. Encryption may help secure the invention from malicious activity.

In an embodiment, the authentication request may be determined to be legitimate by the program when the user is authenticated by providing a government-issued identification card to a camera in communication with the computer program product. For example, when prompted, the user may hold up a government issued ID card to a camera. The camera may then send an image of the ID card to the authentication computer program product. If the information on the ID card matches what is stored within a database regarding the user, the program may authenticate the user and determine that the request for authentication is legitimate. Any other method or ability to authenticate the user (passwords, PINs, biometric attributes, etc.) may also be used to determine that the request for authentication is legitimate.

In an embodiment, the computer program product may be configured to use one or more artificial intelligence/machine learning ("AI/ML") algorithms to perform one or more of its functions. Any appropriate AI/ML algorithm may be used. For example, the computer program may use an AI/ML algorithm to make the determination that the request is legitimate and authenticate the user. Or an AI/ML algorithm may be used to create an avatar overlay or determine certain aspects of the avatar overlay (such as the time limit). In addition, an AI/ML algorithm may be used to determine which output channel to send the avatar overlay, especially if multiple output channels are available.

In an embodiment, the authentication request may be determined to be legitimate when the user provides one or more passwords (or other secure authentication methods) to the computer program product.

In an embodiment, the request may be determined to be legitimate (i.e., the user may be authenticated) when the user provides a government-issued identification card to a camera in communication with the computer program product and provides one or more real-time biometric attributes to one or more biometric sensors in communication with the computer program product. Multiple avenues of authentication may make the authentication provided by the program more accurate and more secure. Biometric sensors may include fingerprint readers, palm print readers, retinal scanners, facial recognition, voice recognition, as well as any other suitable biometric sensor.

In an embodiment, the request may be determined to be legitimate (i.e., the user may be authenticated) when the user provides a government-issued identification card to a camera in communication with the computer program product and provides a real-time image of the user to the camera. For example, the user may provide the ID card and have a picture/video taken by the same camera or web camera. In an embodiment, the user may hold the ID card next to her face while taking the picture or video. In an embodiment, a three-dimensional ("3D") scanner may be used to scan the user's face or other body parts.

In an embodiment, the time-limited avatar overlay may be limited to one session within the metaverse. In this embodiment, the avatar overlay may not necessarily have an integer time limit, but rather the time limit may be connected to the time the user spends within a session in the metaverse. For example, the avatar overlay may expire when the user exits the metaverse session, even though the user may spend hours within the metaverse session.

In an embodiment, the time-limited avatar overlay may be a digital representation of a government-issued identification card belonging to the user. For example, when the user provides an ID card for authentication to the program (through a camera or other scanner), the program may copy or translate that ID card and create a digital copy to be used within the metaverse. Just as a customer must present an ID card when she is attempting to withdraw money from a bank account at a physical bank branch, the customer may present the digital ID card as authentication when attempting to perform a transaction within a metaverse bank branch/storefront.

In an embodiment, the time-limited avatar overlay may be a digital representation of an image of the user. For example, when the user authenticates herself with a picture (or 3D scan), the program may copy or translate that picture (or scan) into a digital representation of the user (i.e., an actual facsimile of the user's face). In an embodiment, the avatar overlay may appear as a hologram within the metaverse. A hologram may be easier to create when the user authenticates with a 3D scan.

In an embodiment, the time-limited avatar overlay may be a digital representation visible to a computer and invisible to the user. For example, the avatar overlay may simply be a code that does not visually appear within the metaverse, but a computer or other scanner within the metaverse may be able to access and read the code.

In an embodiment, the time-limited avatar overlay may be a QR code that may be scanned within the metaverse.

A method for authenticating a user within a metaverse is provided. A user may desire to be authenticated within a metaverse for a variety of reasons, including financial transactions within the metaverse. In some embodiments, the user may attempt authentication before logging into/entering a metaverse session. In other embodiments, the user may attempt authentication while within a metaverse session.

The method may include receiving at an authentication computer program a request to authenticate the user from the user. In an embodiment, the request may be transmitted from a third-party. For example, a third-party may request that a user be authenticated before transacting business with the user. The third-party may send a link or other connection request to the user, so that the user may authenticate.

The computer program may be located at a server. The server may be centralized or distributed. Centralized servers may be cheaper and easier to operate. Distributed servers may be more secure and more powerful.

The method may include determining, by the authentication computer program, that the request is legitimate. The determination may be performed through a variety of methods. A legitimate request may include a valid request from the user attempting to authenticate. An illegitimate request may be transmitted from a malicious actor.

The method may include authenticating, by the authentication computer program, the user. Any suitable authentication protocol or method may be used. In an embodiment, the steps of determining the request is legitimate and authenticating the user may be the same step, in that in order to determine that the request is legitimate, the program may be required to authenticate the user. If the user cannot be authenticated, the request may be determined to be illegitimate.

The method may include creating, by the authentication computer program, a time-limited avatar overlay. The avatar overlay may only be created when the request is determined to be legitimate, and the user has been authenticated. The avatar overlay may take any suitable form.

The method may include transmitting, to the user, the time-limited avatar overlay. The transmission may be to the same channel where the authentication request originated. The transmission may be to a different channel than where the authentication request originated. For example, if the user transmitted the authentication request from a mobile device, but accesses the metaverse through a desktop computer, the transmission of the avatar overlay may be to the desktop computer instead of the mobile device.

The method may include displaying, when prompted by the user, the time-limited avatar overlay within the metaverse. For example, when the user desires to consummate a transaction within the metaverse that requires authentication (e.g., a financial transaction), the user may select an option to display the avatar overlay. In another embodiment, the avatar overlay may be constantly displayed within the metaverse. For example, the avatar overlay may be a specific color assigned to an authenticated user, or a sign that states "This user is authenticated" (or anything similar). These avatar overlays may be constantly displayed while the user is authenticated. Any other user or computer within the metaverse may be able to determine with a glance that the user is authenticated. This may increase trust between users of the metaverse.

As the avatar overlays are time-limited, they may expire at a specific time, after a pre-determined length of time, or after a specific condition (such as the user exiting the metaverse session) is met. In an embodiment, the time-limited avatar overlay may expire after a pre-determined length of time. In an embodiment, the pre-determined length of time may be variable.

In an embodiment, the authentication computer program may determine the request is legitimate when the user provides a government-issued identification card to a camera in communication with the computer program product.

In an embodiment, the time-limited avatar overlay may be a digital representation of a government-issued identification card belonging to the user.

In an embodiment, the time-limited avatar overlay may be a digital representation visible to a computer and invisible to the user.

An apparatus for authenticating a user within a metaverse is provided. The apparatus may include a server. The server may centralized or decentralized. The server may include a communication link, a processor, and a non-transitory memory, as well as other components.

The non-transitory memory may be configured to store at least an operating system and an authentication program. The authentication program may include executable instructions that when executed on the processor may be configured to receive, from the user, a request to authenticate the user, determine that the request is legitimate and authenticate the user, create a time-limited digital authentication token, transmit the time-limited digital authentication token to the user, and present the time-limited digital authentication token within the metaverse when prompted by the user.

The time-limited digital token may be an avatar overlay. The digital token may be represented within the metaverse as an actual token or other symbol. In an embodiment, the digital token may take the form of an ID card. The ID card may function similar to a physical ID card within reality. The more secure the digital token ID card, the more advanced the transactions the user may be able to consummate. For example, a passport is more secure than a library card, and a customer or user will be able to do more with a passport than a library card. As a digital token representation of an ID card, the more secure the authentication of the user may be, the more trustworthy the digital token may be.

In an embodiment, the time-limited digital authentication token may include a timer displaying a decreasing amount of time corresponding to a time limit.

In an embodiment, the authentication program may include one or more artificial intelligence/machine learning ("AI/ML") algorithms configured to perform one or more of its functions.

Various protocols for wired or wireless communication may be used by the apparatus and authentication program. The communication link may provide Wi-Fi, Near Filed Communication ("NFC"), cellular (including 5g), Bluetooth or any other suitable mode of wired or wireless communication. Wi-Fi may include passive Wi-Fi having lower power consumption than typical Wi-Fi.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with any computing device where the user may attempt to authenticate from as well as any server or servers. The communication link may include any necessary hardware (e.g., antennae) and software to control the link. Any appropriate communication link may be used. In an embodiment, the network used may be the Internet. In another embodiment, the network may be an internal intranet.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 is a block diagram that illustrates a computing device/apparatus 100 that may be used in accordance with the principles of the invention. The device 101 may have a processor 103 for controlling overall operation of the device and its associated components, including RAM 105, ROM 107, input/output ("I/O") module 109, and memory 115.

I/O module 109 may include a microphone, keypad, touchscreen, microphone, camera/eye tracker, stylus, or other apparatus through which a user of device 101 may provide input and may also include one or more of a speaker for providing audio output and a video display device for providing textual, audiovisual and/or graphical output. Software may be stored within memory 115 and/or other storage (not shown) to provide instructions to processor 103 for enabling device 101 to perform various functions, such as providing real-time customized software to a user or target output channel. For example, memory 115 may store software used by device 101, such as an operating system 117, application programs 119, and an associated database.

Alternatively, some or all of computer executable instructions of device 101 may be embodied in hardware or firmware (not shown).

Device 101 may operate in a networked environment supporting connections to one or more remote computers or servers, such as terminals 141 and 151. Terminals 141 and 151 may be backend computers, servers, or other channels that include many or all of the elements described above relative to device 101. The network connections depicted in FIG. 1 include a local area network (LAN) 125 and a wide area network (WAN) 129 but may also include other networks.

When used in a LAN networking environment, device 101 is connected to LAN 125 through a network interface or adapter 113.

When used in a WAN networking environment, device 101 may include a modem 127 or other means for establishing communications over WAN 129, such as Internet 131. Bluetooth, cellular, NFC or other communication protocols may also be used.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to utilize the apparatus. Any of various conventional web browsers may be used to display and manipulate data on web pages. It is anticipated that the apparatus may be used to provide authentication services to a user within a metaverse.

Additionally, application program 119, which may be used by device 101, may include computer executable instructions for invoking user functionality related to communication, such as email, short message service (SMS), authentication services and voice input and speech recognition applications.

Device 101 and/or terminals 141 or 151 may also be referred to as nodes on a network and may be mobile terminals including various other components, such as a battery, speaker, and antennas (not shown). Terminal 151 and/or terminal 141 may be portable devices such as smart glasses, mobile phones, smart phones, tablet computers, computers, laptops, servers or any other suitable device for providing authentication services to a user.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform various functions such as creating and providing authentication services to a user, and/or performing any other suitable tasks.

In addition to regular computers, the invention may be operational with numerous other general purpose or special purpose computing system environments or configurations, particularly with respect to the server(s). Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, ATMs, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
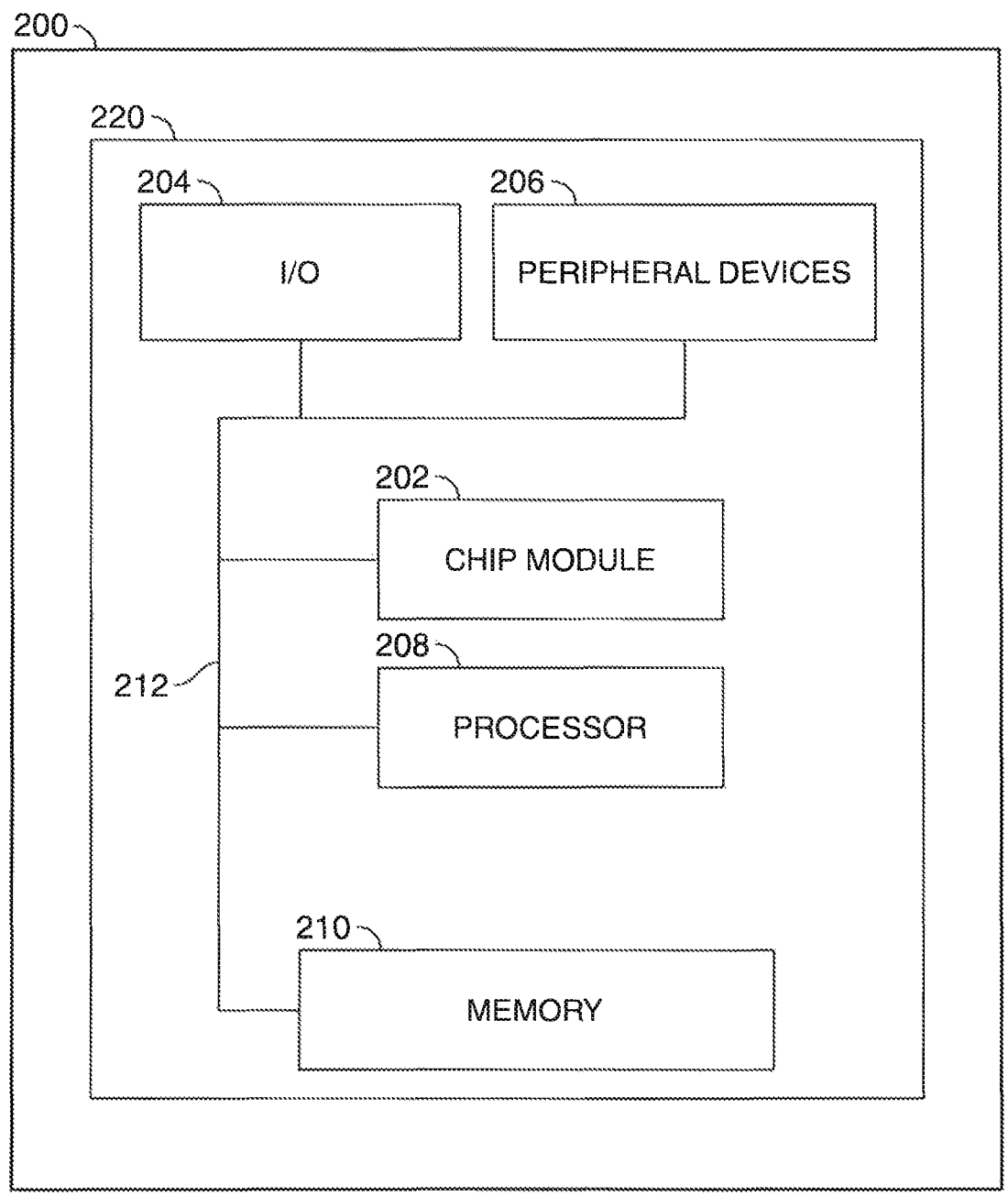
FIG. 2 shows illustrative apparatus in accordance with principles of the disclosure.

FIG. 2 shows an illustrative apparatus 200 that may be configured in accordance with the principles of the invention.

Apparatus 200 may be a computing machine, such as a server. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may run any software application or applications described herein, and machine-readable memory 210.

Machine-readable memory 210 may be configured to store in machine-readable data structures: data, programming functions, units of programming code associated with the programming functions and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
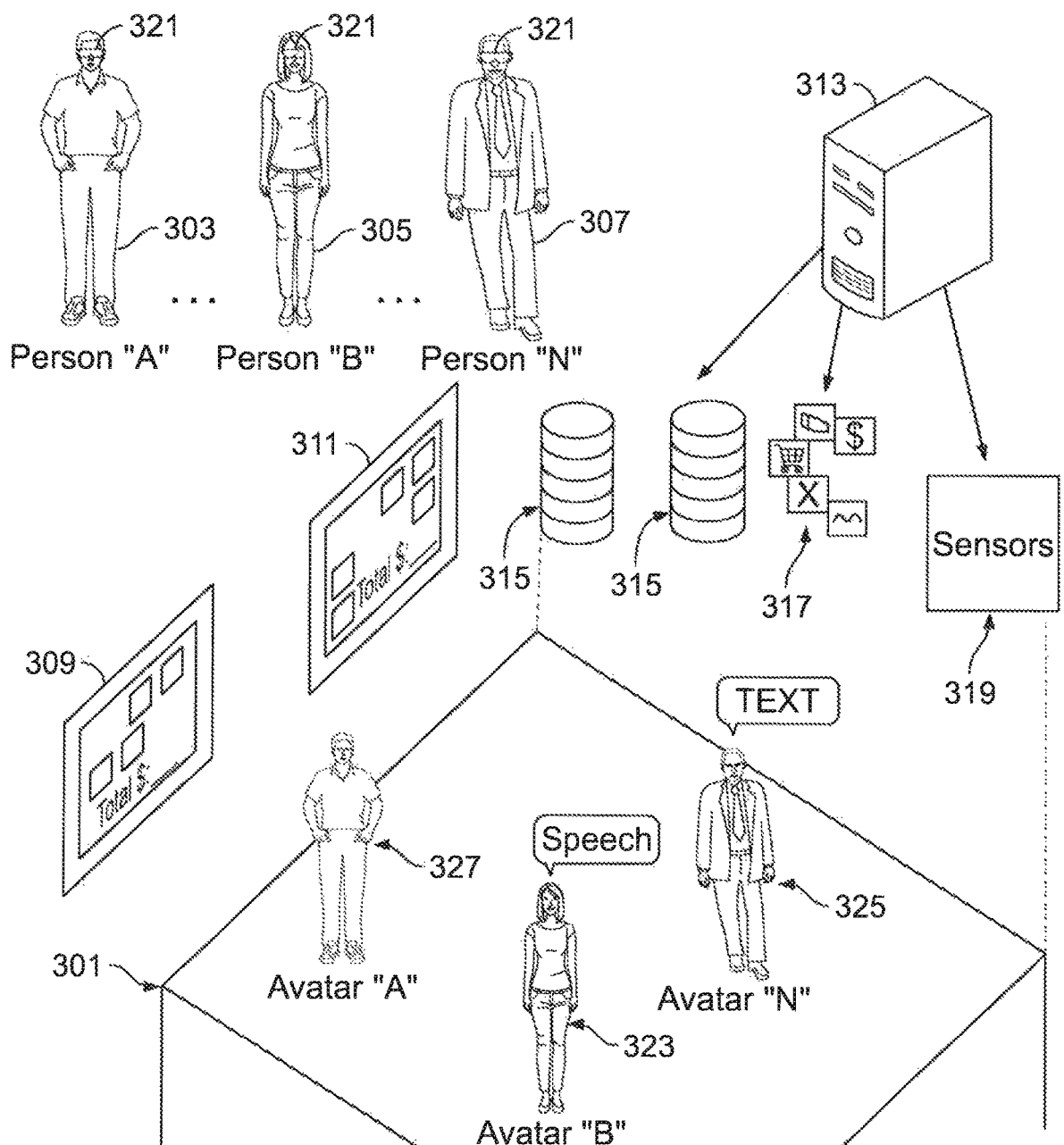
FIG. 3 shows an illustrative schematic in accordance with the principles of the disclosure.

FIG. 3 shows an illustrative schematic of a metaverse in accordance with the principles of the disclosure.

Metaverse session 301 may be powered by one or more servers 313. Servers 313 may include databases 315, applications 317, and sensors 319, among other components.

Users 303, 305, and 307 (through "n" users) may access metaverse session 301 through virtual reality headsets 321 (one for each user) or other apparatus. Other access capabilities may be used. The users 303, 305, 307 may communicate with servers 313 to access metaverse session 301.

Users 303, 305, and 307 (through "n" users) may appear as avatars 323, 325, 327 (through "n" avatars) within the metaverse session 301. The users may interact with each other, with storefronts 309 and 311, other applications 317, or other aspects of metaverse session 301 (not shown).

Figure 4:
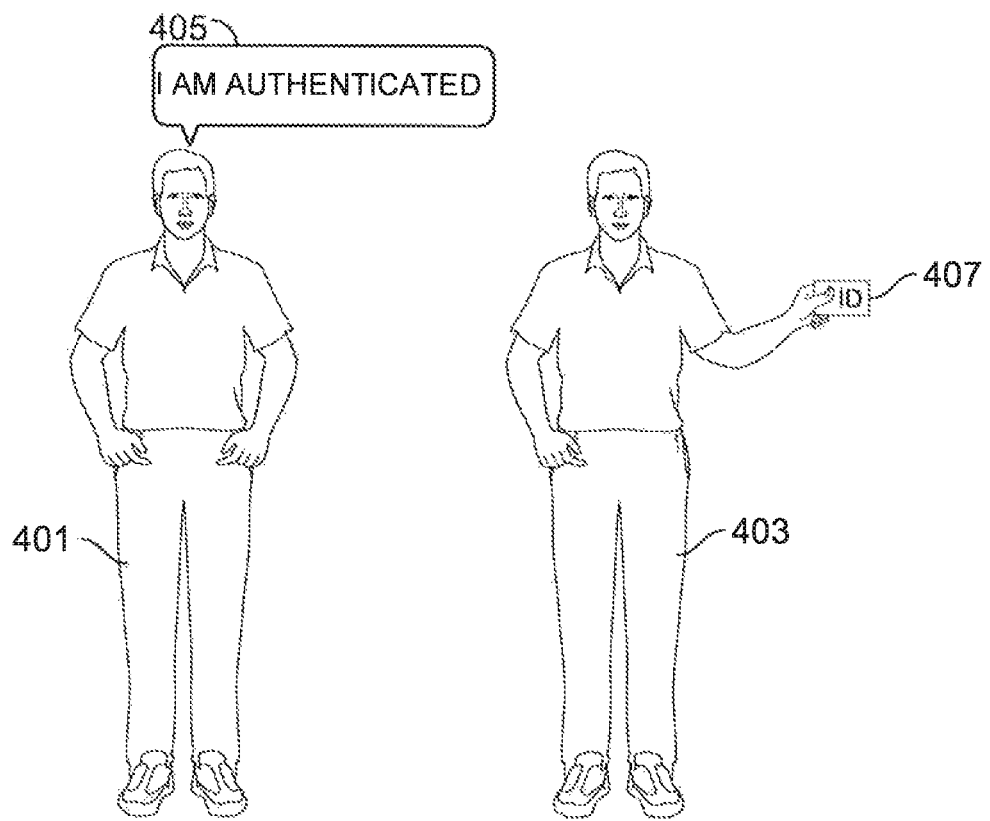
FIG. 4 shows illustrative examples in accordance with the principles of the disclosure.

FIG. 4 shows illustrative examples in accordance with the principles of the disclosure.

User 1 (not shown) may be represented by avatar 401 in a metaverse session (not shown). User 1 may be authenticated by authentication computer program (not shown). The computer program may create and provide an avatar overlay 405 to user 1. Avatar overlay 405 may take any appropriate form, including a speech bubble that appears over the avatar, as shown in FIG. 4.

User 2 (not shown) may be represented by avatar 403 in a metaverse session (not shown). User 2 may be authenticated by authentication computer program (not shown). The computer program may create and provide an avatar overlay 407 to user 2. Avatar overlay 407 may take any appropriate form, including a digital token ID card, as shown in FIG. 4.

Figure 5:
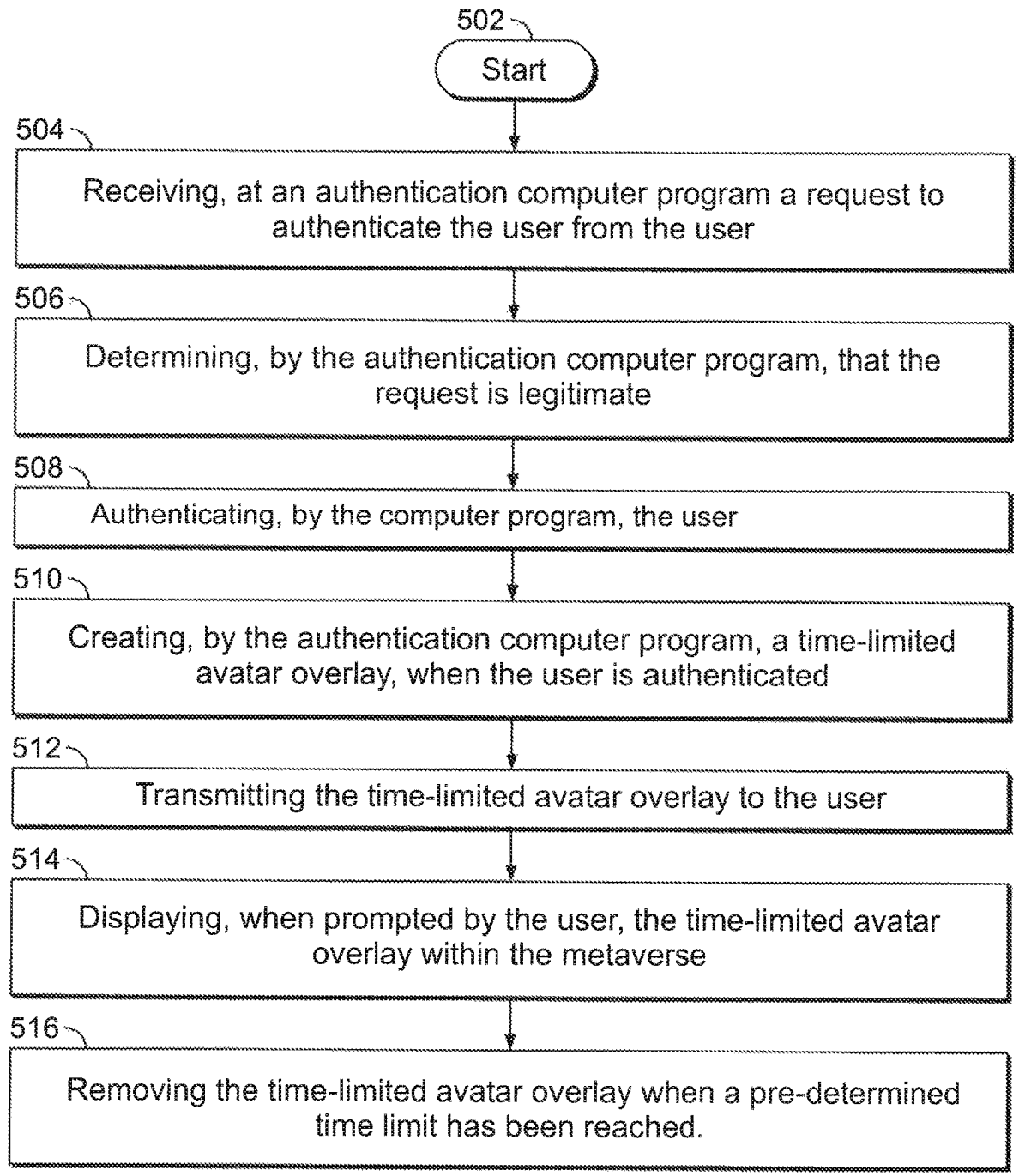
FIG. 5 shows an illustrative flowchart in accordance with the principles of the disclosure.

FIG. 5 shows an illustrative flowchart in accordance with principles of the invention. Methods may include some or all of the method steps numbered 502 through 516. Methods may include the steps illustrated in FIG. 5 in an order different from the illustrated order. The illustrative method shown in FIG. 5 may include one or more steps performed in other figures or described herein. Steps 502 through 516 may be performed on the apparatus shown in FIGS. 1-4 and 6, or other apparatus.

At step 502, the method may begin. At step 504, an authentication computer program product may receive a request to authenticate a user from the user. The user may transmit the request from any appropriate input channel, such as a desktop computer, mobile computer, mobile phone, smartphone application, or other channel. The input channel may be the same or different than an output channel. The input channel may have access to a metaverse session. The input channel may not have access directly to a metaverse session.

At step 506, the authentication computer program may determine whether request to authenticate is legitimate or not. If the request is legitimate (e.g., it has been transmitted by or on behalf of the user, as opposed to a malicious actor), the computer program may then proceed to attempt to authenticate the user.

At step 508, the authentication computer program may authenticate the user. Any suitable authentication protocol or method may be used. Standard authentication protocols such as passwords, PINs, measuring biometric attributes may be used alone or in combination. Authentication may include a 3D scan of the user, or part of the user (such as the user's face or head). A 3D scan may be used to create a computerized hologram of the user or part of the user for use within the metaverse. A failure to authenticate the user may end the method.

At step 510, the authentication computer program may create an avatar overlay or digital token indicating that the user has been authenticated, when the program has actually authenticated the user. (Authenticating the user may mean that the user has the identity requested, i.e., Jane Doe is Jane Doe.) In an embodiment, the authentication computer program may use an AI/ML method or algorithm to create the avatar overlay or digital token. The avatar overlay or digital token may be time limited. The avatar overlay or digital token may automatically expire when an expiry condition has been met. An expiry condition may include: a particular time, an elapsed amount of time, another condition such as the exit of the user from the metaverse session.

At step 512, the authentication computer program may transmit the avatar overlay or digital token to the user, so that the user may use the authentication within an metaverse session. Any appropriate transmission or communication protocol may be used, including Wi-Fi, Bluetooth, cellular signals, etc. The authentication computer program may identify an appropriate output channel to transmit the avatar overlay or digital token to through an AI/ML algorithm. Appropriate output channels may include the input channel or other computing devices used by or belonging to the user. One appropriate output channel may be the computing device the user utilizes to access the metaverse session within which the user requires authentication. This output channel may be the same or different than the input channel.

At step 514, the authentication computer program may display the avatar overlay or digital token within the metaverse session, when prompted by the user. In an embodiment, the user's computer that is connected to the metaverse session may display the avatar overlay or digital token. The user may have requested authentication before or during a metaverse session. Various storefronts, activities, or transactions within a metaverse session may require different levels of security and authentication.

At step 516, the avatar overlay or digital token may be removed from the metaverse when a removal condition has been met (i.e., the avatar overlay or digital token has expired). One example of a removal condition may be the elapsing of a pre-determined time limit.

Figure 6:
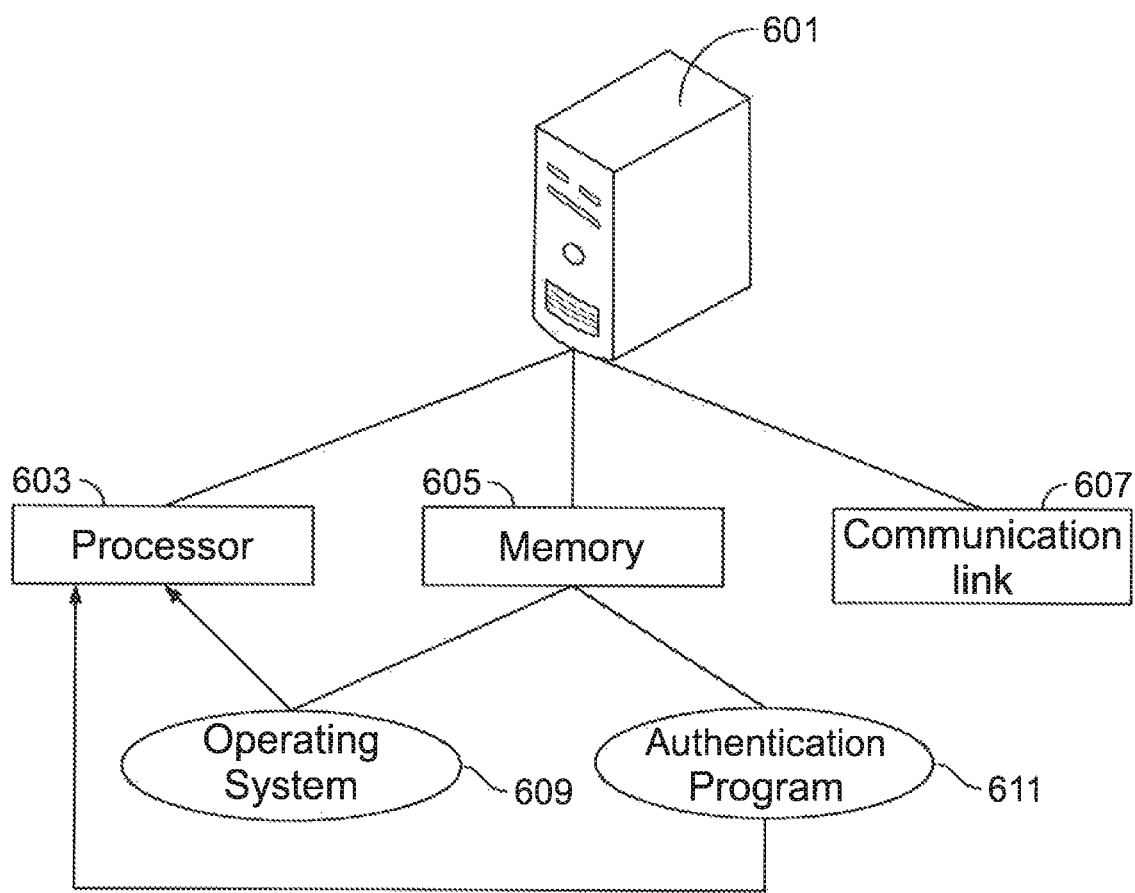
FIG. 6 shows an illustrative apparatus in accordance with the principles of the disclosure.

FIG. 6 shows an illustrative apparatus in accordance with the principles of the disclosure.

A server 601 may be centralized or distributed. The server 601 may include a processor 603, non-transitory memory 605, a communication link 607, as well as other components (not shown), such as an input/output module, a display, and peripherals.

The non-transitory memory 605 may include an operating system 609 and an authentication program 611, as well as other applications (not shown). The operating system 609 and authentication program 611 may include executable instructions that may be executed on the processor 603.

Among other things, the authentication program 611 may be configured to: receive, from the user, a request to authenticate the user; determine that the request is legitimate and authenticate the user; create a time-limited digital authentication token; transmit the time-limited digital authentication token to the user; and present the time-limited digital authentication token within the metaverse when prompted by the user.

Thus, apparatus and methods to simulate and provide authentication services for a user within the metaverse have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. An authentication computer program product for authenticating a user within a metaverse, the computer program product comprising executable instructions, the executable instructions when executed by a processor on a computer system:
   receive, from the user, a request to authenticate the user;
   determine that the request is legitimate;
   create a time-limited avatar overlay;
   transmit the time-limited avatar overlay to the user; and
   continuously display the time-limited avatar overlay within the metaverse when prompted by the user;
   wherein the request is legitimate when the computer program product authenticates the user; and
   wherein the avatar overlay is a digital representation visible to a computer and invisible to the user.

2. The authentication computer program product of claim 1 wherein the transmission is encrypted.

3. The authentication computer program product of claim 1 wherein the request is determined as legitimate by the user providing a government-issued identification card to a camera in communication with the computer program product.

4. The authentication computer program product of claim 1 wherein the computer program product is configured to use one or more artificial intelligence/machine learning ("AI/ML") algorithms.

5. The authentication computer program product of claim 1 wherein the request is determined as legitimate by the user providing one or more passwords to the computer program product.

6. The authentication computer program product of claim 1 wherein the request is determined as legitimate by the user:
   providing a government-issued identification card to a camera in communication with the computer program product; and
   providing one or more real-time biometric attributes to one or more biometric sensors in communication with the computer program product.

7. The authentication computer program product of claim 1 wherein the request is determined as legitimate by the user:
   providing a government-issued identification card to a camera in communication with the computer program product; and
   providing a real-time image of the user to the camera.

8. The authentication computer program product of claim 1 wherein the time-limited avatar overlay is limited to one session within the metaverse.

9. The authentication computer program product of claim 1 wherein the time-limited avatar overlay is a digital representation of a government-issued identification card belonging to the user.

10. The authentication computer program product of claim 1 wherein the time-limited avatar overlay is a digital representation of an image of the user.

11. A method for authenticating a user within a metaverse, the method comprising:
    receiving, at an authentication computer program, from the user, a request to authenticate the user;
    determining, by the authentication computer program, that the request is legitimate;
    authenticating, by the authentication computer program, the user;
    creating, by the authentication computer program, a time-limited avatar overlay;
    transmitting, to the user, the time-limited avatar overlay; and
    continuously displaying, when prompted by the user, the time-limited avatar overlay within the metaverse, wherein the time-limited avatar overlay is a digital representation visible to a computer and invisible to the user.

12. The method of claim 11 wherein the authentication computer program determines the request is legitimate by the user providing a government-issued identification card to a camera in communication with the computer program product.

13. The method of claim 11 wherein time-limited avatar overlay expires after a pre-determined length of time.

14. The method of claim 13 wherein the pre-determined length of time is variable.

15. The method of claim 11 wherein the time-limited avatar overlay is a digital representation of a government-issued identification card belonging to the user.

16. An apparatus for authenticating a user within a metaverse, the apparatus comprising:
    a server, the server comprising:
      a communication link;
      a processor; and
      a non-transitory memory configured to store at least:

an operating system; and an authentication program comprising executable instructions that when executed on the processor are configured to:
- receive, from the user, a request to authenticate the user;
- determine that the request is legitimate and authenticate the user;
- create a time-limited digital authentication token;
- transmit the time-limited digital authentication token to the user; and
- continuously present the time-limited digital authentication token within the metaverse when prompted by the user;

wherein the time-limited digital authentication token comprises a digital token visible to a computer and invisible to the user.

17. The apparatus of claim 16 wherein the time-limited digital authentication token comprises a timer displaying a decreasing amount of time corresponding to a time limit.

18. The apparatus of claim 16 wherein the authentication program comprises one or more artificial intelligence/machine learning ("AI/ML") algorithms.

* * * * *